United States Patent [19]

Anderson

[11] Patent Number: 4,912,334
[45] Date of Patent: Mar. 27, 1990

[54] INFRARED AIRCRAFT BEACON LIGHT

[75] Inventor: Michael L. Anderson, Jamestown, Ohio

[73] Assignee: Systems Research Laboratories, Inc., Dayton, Ohio

[21] Appl. No.: 281,377

[22] Filed: Dec. 8, 1988

[51] Int. Cl.$^4$ .................. B64D 39/00; G21G 4/00
[52] U.S. Cl. .................. 250/495.1; 250/493.1; 250/494.1; 362/62
[58] Field of Search ............. 250/493.1, 494.1, 495.1, 250/504 R, 496.1; 362/62, 63; 313/499

[56] References Cited

U.S. PATENT DOCUMENTS

| | | | |
|---|---|---|---|
| 2,704,321 | 3/1955 | Orlansky | 362/62 |
| 4,277,819 | 7/1981 | Sobota et al. | 362/80 |
| 4,398,685 | 8/1983 | Task et al. | 244/135 A |

Primary Examiner—Carolyn E. Fields
Assistant Examiner—John A. Miller
Attorney, Agent, or Firm—Biebel, French & Nauman

[57] ABSTRACT

An infrared aircraft lighting system designed for use in connection with night vision goggles includes a ring structure containing infrared lights that is installed between an existing visible light beacon and the aircraft outer surface, without requiring modification of either the aircraft structure or the existing visible light beacon. A central opening in the ring is aligned with the opening in the aircraft that was created to receive the visible light beacon. A plurality of holes extending through the ring structure permit the mounting bolts passing through a flange on the beacon light to extend on into the aircraft, thus securing both the visible light beacon and the ring structure on the aircraft. A plurality of infrared lights are mounted on said ring structure in a circular pattern so as to be visible from above. A slot formed in the ring's lower surface accommodates the electrical wiring necessary to supply power to the infrared lights.

4 Claims, 2 Drawing Sheets

INFRARED AIRCRAFT BEACON LIGHT

BACKGROUND OF THE INVENTION

This invention relates to an infrared aircraft lighting system designed for use in connection with night vision goggles. Specifically, the invention is directed to an infrared beacon lighting system for installation between an existing visible light beacon on an aircraft without requiring modification of either the aircraft structure or the existing visible light beacon.

When operating aircraft at night, particularly in a covert operation where the normal or visible aircraft lighting system is turned off, it is desirable to have some type of lighting system that permits a pilot to know the exact position of other nearby aircraft. Infrared lighting systems are ideally suited for this purpose since they are not visible to the naked eye, but such lighting systems may be clearly seen by anyone using night vision goggles, which are designed to intensify the light in the infrared spectrum and display the images in visible light to the wearer.

Infrared lighting systems have been installed on aircraft for this purpose, but prior art systems have not proved entirely satisfactory. In one prior art system, the infrared lamps were installed on the upper surface of a visible light beacon, but this requires modification of that beacon, and if it has to be serviced or repaired, then the infrared lighting system will be removed at the same time. Since the infrared lighting systems require far less frequent maintenance than the normal visible light beacon, this results in an inefficient use of material. Further, this will result in the infrared system not be available for use unless another, similarly modified, beacon is installed in its place during the maintenance procedure.

The installation of an infrared lighting system on an aircraft ought to be accomplished without requiring extensive modifications to either the aircraft structure or to the existing visible light beacon system.

SUMMARY OF THE INVENTION

This invention relates to an infrared beacon lighting system for use on the exterior of aircraft in combination with an existing visible light beacon.

The present invention requires no modification of either the existing visible light beacon or the aircraft structure. In this invention, the infrared beacon lighting system is installed using the existing mounting holes and openings in the aircraft structure; the invention is merely installed between the visible light beacon and the outer skin of the aircraft.

Specifically, the present invention includes a ring structure having generally planar exterior and lower surfaces, and a central opening. The central opening is aligned with the opening in the aircraft that was made for the visible light beacon and has a diameter which is large enough to permit the free passage of the beacon therethrough.

A plurality of holes extending through the ring structure permit the mounting bolts passing through a flange on the beacon light to extend on into the aircraft, thus securing both the visible light beacon and the ring structure on the aircraft.

A plurality of infrared lights are mounted on said ring structure in a circular pattern so as to be visible from above. Preferably, six infrared lamp assemblies are installed on the ring structure so the lights are visible from above the plane formed by the ring structure. A slot formed in the ring's lower surface accommodates the electrical wiring necessary to supply power to the infrared lights.

The electrical wiring from the infrared lamps is connected to the aircraft power through a switch assembly, which may be included on a separate control panel, to cause the lights to be operated in either a steady state or in a pulsed mode, or to be turned off altogether.

Accordingly, it is an object of this invention to provide an infrared beacon lighting system for use on the exterior of aircraft in combination with an existing visible light beacon without requiring modification of either the aircraft structure or the existing visible light beacon.

It is a further object of this invention to provide an infrared beacon lighting system for use on the exterior of aircraft in combination with an existing visible light beacon comprising a ring structure having generally planar exterior and lower surfaces, and a central opening the diameter of which is large enough to permit the free passage therethrough of an existing beacon light; means forming a plurality of holes through said ring structure for receiving the mounting bolts that secure the beacon light to the aircraft, a plurality of infrared lights, and means for mounting said infrared lights on said ring structure.

Other objects and advantages of the invention will be apparent from the following description, the accompanying drawings and the appended claims.

DESCRIPTION OF THE PREFERRED EMBODIMENT

Figure 1:
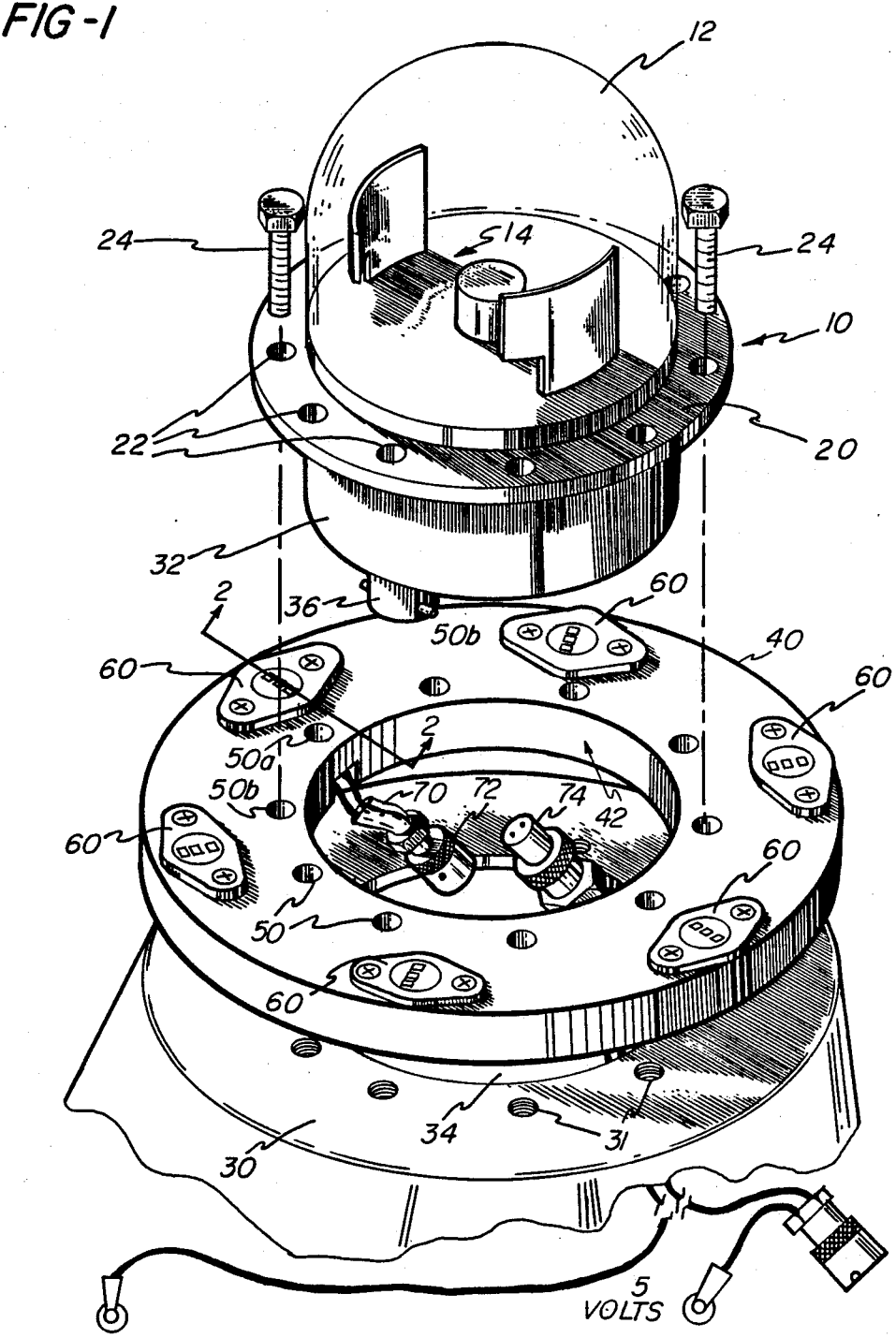
FIG. 1 is an exploded perspective view showing an infrared beacon lighting system installed between an existing visible light beacon and the aircraft structure.

Referring now to the drawings, and particularly to FIG. 1 which illustrates a preferred embodiment of the invention, a standard visible light beacon 10 is provided with a transparent cover 12 over a source of light 14. The light source 14 typically includes a lamp and one or more mirrors which may or may not rotate. The light source may also include multiple light sources, for example, a white light and a red light. The lights may be of the strobe type, which flash at some predetermined rate, or they may be on continuously. The beacon structure also includes a flange 20 which is provided with a plurality of holes 22 through which mounting bolts 24 extend into the structure of the aircraft 30 which is provided with threaded holes 31. The body 32 of the beacon 10 below the flange 20 extends into an opening 34 formed in the aircraft. An electrical terminal 36 is provided to supply power to the beacon lamps and motors from the aircraft's electrical system.

The present invention includes a ring structure, shown generally at 40 in FIG. 1, having a circular central opening 42, the diameter of which is large enough to permit the free passage therethrough of an existing beacon body 32. In the embodiment shown, the ring structure 40 has a planar upper or exterior surface 44 and a lower surface 46 and is 6.25 inches in diameter and 0.375 inches thick. The central opening 42 is 4.125 inches in diameter.

A plurality of holes 50 are formed around the central opening that extend through said ring structure 40 for receiving the mounting bolts 24 that secure the beacon light to the aircraft. As shown, ten such holes 50 are provided, and they have the same spacing as those formed in the flange 20 of a standard aircraft beacon. From an index hole 50a, the two adjacent holes 50b are spaced at 30°; the remaining holes are spaced 37.5° apart. The holes 50 are 0.187 inches in diameter and their centers are on a 4.675 inch diameter circle.

Figure 2:
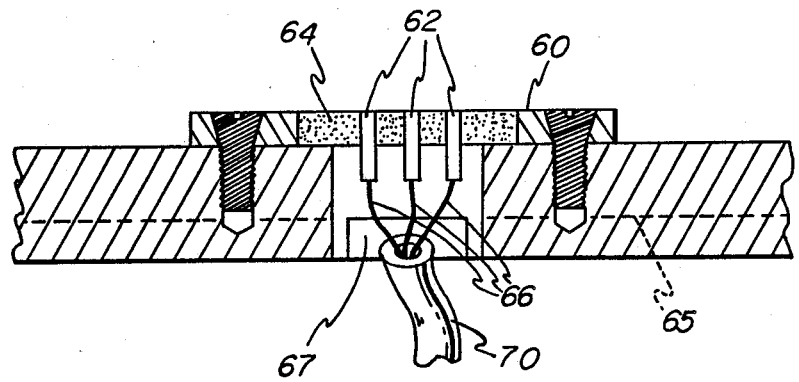
FIG. 2 is a cross sectional view taken along lines 2—2 of FIG. 1.
Figure 3:
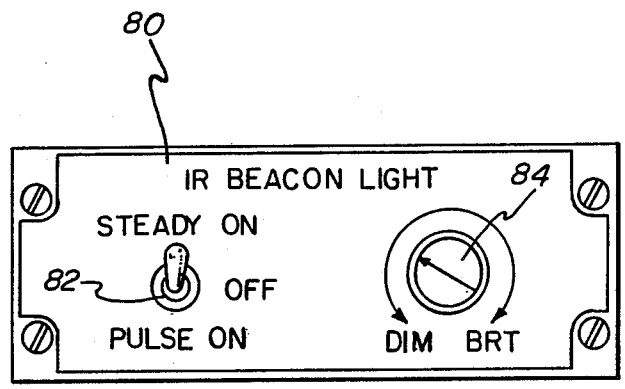
FIG. 3 is an elevational view of a control panel that may be used with the present invention.

Infrared lights are placed in the ring structure so as to be visible from above the plane of the exterior surface 44. As shown in FIG. 2, six such infrared lamp assemblies 60 are mounted on the ring structure, but this is only for convenience and is not a design limitation. The infrared lamp assemblies 60 preferably each include three infrared elements 62 as shown in FIG. 1. These elements may be encased in an epoxy material 64.

A grove 65, approximately 0.190 inches wide and 0.125 inches deep, extends around the ring structure on the interior surface. This grove receives the electrical wires 66 that connect the infrared lights with their source of power. As shown in FIG. 2, another grove 67 extends radially inwardly from grove 65 to the central opening. This permits a cable 70 (FIG. 1) to extend through the opening 34 into the interior of the aircraft. This cable is terminated in a connector 72, and a mating connector 74, connected to a control panel 80 (FIG. 4) supplies the necessary power and controls 82 and 84 the mode of operation of the infrared lights, whether in the steady state or flashing mode or off, and their brightness.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. An infrared beacon lighting system for use on the exterior of aircraft in combination with an existing visible light beacon comprising:
    a ring structure having generally planar exterior and lower surfaces, and a central opening the diameter of which is large enough to permit the free passage therethrough of an existing beacon light;
    means forming a plurality of holes through said ring structure for receiving the mounting bolts that secure the beacon light to the aircraft,
    a plurality of infrared lights, and
    means for mounting said infrared lights on said ring structure.

2. The infrared beacon lighting system of claim 1 wherein said mounting means includes means forming a plurality of openings in said ring structure exterior surface into which the infrared lights are placed so as to be viewable from above the plane of the exterior surface.

3. The infrared beacon lighting system of claim 1 further including means forming a slot in said ring structure lower surface through which electrical wires are placed to connect said infrared lights to a source of power.

4. An infrared beacon lighting system for installation between an existing visible light beacon on an aircraft without requiring modification of the aircraft structure comprising
    a ring structure having generally planar exterior and lower surfaces, and a central opening the diameter of which is large enough to permit the free passage therethrough of an existing beacon light;
    means for mounting said ring structure and the beacon light to the aircraft, and
    a plurality of infrared lights in generally equally spaced intervals mounted on said ring structure.

* * * * *